UNITED STATES PATENT OFFICE.

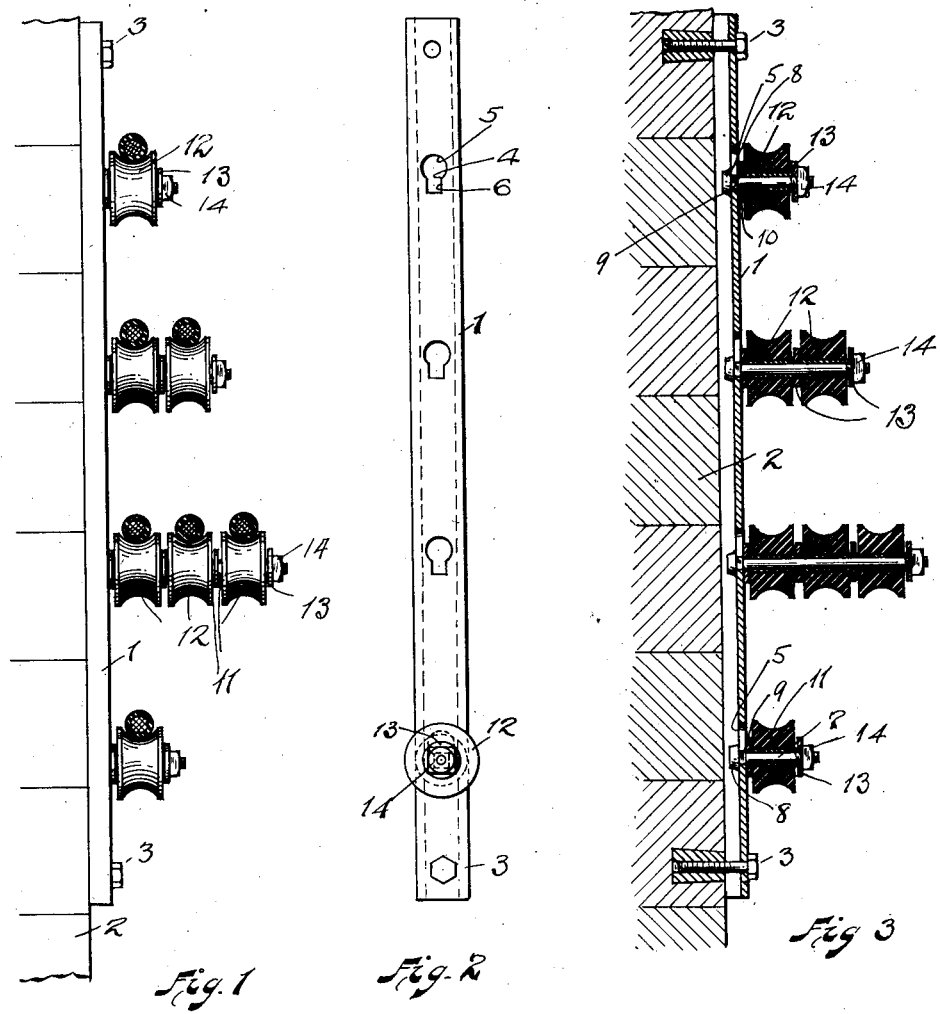

EDWARD H. SMITH, OF CLEVELAND, OHIO, ASSIGNOR OF ONE-HALF TO W. H. HARTMAN, OF CLEVELAND, OHIO.

SUPPORT FOR CONDUIT-CABLES.

1,079,445.  Specification of Letters Patent.  Patented Nov. 25, 1913.

Application filed February 24, 1913. Serial No. 750,139.

*To all whom it may concern:*

Be it known that I, EDWARD H. SMITH, a citizen of the United States, and a resident of Cleveland, county of Cuyahoga, and State of Ohio, have invented a new and useful Improvement in Supports for Conduit-Cables, of which the following is a specification, the principle of the invention being herein explained and the best mode in which I have contemplated applying that principle, so as to distinguish it from other inventions.

The subject of the present invention is a bracket or support intended chiefly, but not exclusively, for use in supporting cables and the like in manholes. It has been a matter of some difficulty to secure a proper bracket or support for this purpose which will hold the cables to be supported freely, that is, in such a manner that the expansion and contraction of the same may be cared for without friction on the cable, and at the same time to provide the support with means permitting addition of other devices when desired to take care of additional cables. The present invention is designed to provide for these two objects, and from the following description it will be readily seen that not only are the cables supported with a minimum of friction upon movement of the cables, but also that it is an extremely simple matter to substitute a slightly modified form of bracket if it is necessary to support additional cables.

To the accomplishment of these and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:—Figure 1 is a side elevation of my invention as attached to a wall; Fig. 2 is a front elevation showing the construction of the fixed support; Fig. 3 is a section similar to Fig. 1 and showing the same supporting means; and Fig. 4 is a view in perspective of one of these supporting arms or brackets.

In Fig. 1 there is shown a fixed support 1 attached to wall 2, the fixed support consisting preferably of a channel section of U-shape which is directed inwardly toward the wall and secured to the same by means of lag-bolts 3. The supporting brackets here shown in the form of laterally extending bolts are attached to the fixed support in the manner shown in Figs. 2 and 3, the fixed support being provided with bayonet apertures 4 which consist of an enlarged aperture 5 connecting with a narrower aperture 6 in the usual manner. In this way removal of the bolts is facilitated, while means are provided for securely retaining the bolts in engagement with the apertures.

The form of brackets which I preferably use is shown in Fig. 4 and will be seen to consist of a bolt-like member 7 provided at one end with a head 8 and threaded at the other end. Adjacent to the head 8 is a square portion 9 which is formed integral with the bolt. The head 8 is of a size adapting it to enter freely the larger portion 5 of the bayonet slot while the square portion 9 is formed to fit snugly within the narrower portion of the slot, thus retaining the bolt against rotation and preventing the disengagement of the head from the fixed support. The heads will be inserted through the larger portions 5 of the bayonet slot into the channel of the support and the bolt then forced downwardly until it is held in the narrow portion 6 of the slot. Externally of the support there is disposed upon the bolt a washer 10 and upon the bolt externally of the washer there is removably mounted a sleeve 11, such sleeve being also rotatable on said bolt normally when not held by some other external means. Upon the sleeve there is rotatably mounted a roller 12 which is adapted to receive the cable, and is of any suitable form for that purpose, such roller being preferably of insulating material such as fiber. The roller is slightly narrower than the length of the sleeve, thus permitting a second washer 13 to be disposed upon the bolt externally of the sleeve and to force the same against the first-named washer 10, thus drawing the head of the bolt against the inner side of the support without in any way cramping or binding the roller 12. A nut 14 or similar means will of course be used to force the washer 13 against the sleeve in order to draw the bolt head against the inside of the support. When the device is assembled in the manner stated it is impossible for the bolt to work upwardly into such a position that the head may slide through the enlarged portion 5 of the bayonet slot, this being prevented, not only by the frictional engagement between the head and the support, but also by the weight of the cable upon the roller, as will be readily understood.

The use of a single roller and the bolt for the same is shown at the top of Figs. 1 and 3, while beneath the same are shown bolts adapted to receive two and three rollers respectively, and it will be noted that the only difference in the construction will be the use of a longer bolt and the use of a plurality of sleeves, each two sleeves being separated by means of a washer. In this way each roller is rotatably mounted upon a single sleeve, and each sleeve will be of a length greater than the width of the roller, thus permitting free rotation of the rollers and secure clamping of the bolt against the support.

The advantages of the present construction may be readily seen, and are the simplicity and convenient assembly of the device with ease of removal for the purpose of substituting a bracket adapted to receive a greater or less number of rollers.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a support for cables and the like, the combination of a fixed support provided with a bayonet slot; a bolt entering such slot and having a head adapted to prevent removal of said bolt from the narrower portion of such slot; means adapted to secure said bolt to said support when such head is engaged in the narrower portion of such slot, said means including a sleeve removably mounted on said bolt and adapted to be pressed against said support opposite such head, thereby drawing the latter into secure frictional engagement with said support; and a roller rotatably mounted on said sleeve, said roller being narrower than the length of said sleeve, whereby pressure on the latter does not prevent free rotation of said roller.

2. In a support for cables and the like, the combination of a fixed support provided with a bayonet slot; a bolt having a head adapted to enter the wider portion of such slot and to lock behind the narrower portion of the same; a sleeve removably mounted on the extending portion of said bolt and adapted to be forced into contact with said support opposite such head; a nut adjustably engaging said bolt and adapted to force said sleeve against said support, thereby drawing such head into secure frictional engagement with said support; and a roller rotatably mounted on said sleeve, said roller being narrower than the length of said sleeve, whereby pressure on the latter does not prevent free rotation of said roller.

3. In a support for cables and the like, the combination of a fixed support provided with a bayonet slot; a bolt having a head adapted to enter the wider portion of the same, and a square portion adjacent such head adapted to snugly enter such narrower portion of such slot; a sleeve removably mounted on said bolt; a washer disposed at either end of said sleeve on said bolt, one of said washers being adjacent to the face of said support against which said bolt-head rests; a nut on said bolt, whereby adjustment of the same against said sleeve forces said bolt-head into secure frictional engagement with said support; and a roller rotatably mounted on said sleeve, said roller being narrower than the length of said sleeve, whereby pressure on the latter does not prevent free rotation of said roller.

4. In a support for cables and the like, the combination of a fixed support provided with a bayonet slot; a bolt having a head adapted to enter the wider portion of the same, and a square portion adjacent such head adapted to snugly enter such narrower portion of such slot; a plurality of sleeves removably mounted on said bolt; washers disposed between and at either end of said sleeves; a nut on said bolt, whereby adjustment of the same against said washers and sleeves clamps said bolt securely to said support; and a roller mounted on each of said sleeves, each said roller being narrower than the length of the corresponding sleeve.

5. In a support for cables and the like, the combination of a fixed support; a bolt having a head adapted to detachably engage behind said support; means adapted to secure said bolt to said support when so engaged, said means including a sleeve removably mounted on said bolt and adapted to be pressed against said support opposite such head, thereby drawing the latter into secure frictional engagement with said support; and a roller rotatably mounted on said sleeve, said roller being narrower than the length of said sleeve, whereby pressure on the latter does not prevent free rotation of said roller.

Signed by me, this 13th day of February, 1913.

EDWARD H. SMITH.

Attested by—
 HORACE B. FAY,
 ANNA L. GILL.